(12) United States Patent
Hartman

(10) Patent No.: US 6,209,307 B1
(45) Date of Patent: Apr. 3, 2001

(54) THERMODYNAMIC PROCESS FOR GENERATING WORK USING ABSORPTION AND REGENERATION

(75) Inventor: Thomas L. Hartman, Jupiter, FL (US)

(73) Assignee: FPL Energy, Inc., Juno Beach, FL (US)

(*) Notice: Subject to any disclaimer, the term of this patent is extended or adjusted under 35 U.S.C. 154(b) by 0 days.

(21) Appl. No.: 09/305,521

(22) Filed: May 5, 1999

(51) Int. Cl.⁷ ...................................................... F02C 6/18
(52) U.S. Cl. .......................... 60/39.02; 60/39.181; 60/649
(58) Field of Search ............................... 60/39.02, 39.181, 60/39.52, 649, 673

(56) References Cited

U.S. PATENT DOCUMENTS

| | | |
|---|---|---|
| 3,796,045 | 3/1974 | Foster-Pegg . |
| 4,009,575 | 3/1977 | Hartman, Jr. et al. . |
| 4,121,912 | 10/1978 | Barber et al. . |
| 4,195,485 * | 4/1980 | Brinkerhoff ............................ 60/649 |
| 4,224,299 | 9/1980 | Barber et al. . |
| 4,238,925 | 12/1980 | Lowther . |
| 4,292,808 * | 10/1981 | Lohmiller ............................... 60/673 |
| 4,346,561 | 8/1982 | Kalina . |
| 4,392,346 | 7/1983 | Fink . |
| 4,489,563 | 12/1984 | Kalina . |
| 4,841,721 | 6/1989 | Patton et al. . |
| 5,265,410 | 11/1993 | Hisatome . |
| 5,557,936 | 9/1996 | Drnevich . |
| 5,572,871 * | 11/1996 | Kalina ..................................... 60/649 |
| 5,666,800 | 9/1997 | Sorensen et al. . |
| 5,715,682 | 2/1998 | Nakata . |
| 5,813,215 | 9/1998 | Weisser . |
| 5,865,023 | 2/1999 | Sorensen et al. . |
| 6,058,695 | 5/2000 | Ranasinghe et al. . |
| 6,065,280 | 5/2000 | Ranasinghe et al. . |

* cited by examiner

Primary Examiner—Louis J. Casaregola
(74) Attorney, Agent, or Firm—Amster, Rothstein & Ebenstein

(57) ABSTRACT

The present invention is directed to a process for generating work that comprises the steps of: (a) combusting natural gas and oxygen in a combustor to form a gas stream; (b) passing the gas stream through a regenerator where heat from the gas stream causes a strong liquor present in the regenerator to form a carbon dioxide stream and a weak liquor, the reduction of heat from the gas stream resulting in an exhaust gas stream; (c) extracting work from the carbon dioxide stream resulting in a work-extracted carbon dioxide stream; (d) introducing the work-extracted carbon dioxide stream, the exhaust gas stream and the weak liquor to an absorber to cause carbon dioxide to be absorbed by the weak liquor converting the weak liquor into the strong liquor; (e) introducing said carbon dioxide stream remaining from the absorber to waste and/or the combustor; and (f) introducing the strong liquor from the absorber to the regenerator.

24 Claims, 2 Drawing Sheets

THERMODYNAMIC PROCESS FOR GENERATING WORK USING ABSORPTION AND REGENERATION

BACKGROUND OF THE INVENTION

A number of processes are currently being used commercially for converting fossil fuels to electricity. These principally include the cycle power plant incorporating the Brayton and Rankine cycles. A third cycle, namely the Kalina cycle is just now being commercialized.

The Brayton cycle is the process used in gas turbines. In the Brayton cycle, air is compressed in a compressor, and then combusted with fuel, to generate high temperature and high pressure gases which are then expanded through a turbine. Work extracted from the hot gases in the turbine is used to drive a generator for the production of electricity. The combustion process results in the formation of carbon dioxide, water and nitrogen oxides, all of which are released in an uncontrolled fashion to the environment.

The Rankine cycle is commonly known as the steam cycle. In the Rankine cycle, water is boiled at high temperature and pressure. The resulting steam is then expanded to a turbine, extracting work to drive an electric generator. The heat is then removed from the steam in a condenser, converting it to liquid water which is then pumped to higher pressure and returned to the boiler. A combined cycle power plant uses the high temperature exhaust gases in the Brayton cycle as a source of heat in the Rankine cycle.

In the Kalina cycle, heat is added to a multi-component mixture that typically contains ammonia and water. This causes the most volatile component to boil off at the lowest temperature. The boiling point changes with the composition, allowing the boiling process to occur at a range of temperatures. This is unlike the Rankine cycle where the boiling temperature is uniquely determined by the pressure. The vapor produced in the boiling process then passes through a turbine which drives the generator, and then to an absorber. The low volatile liquids (which are not boiled in the boiler) are returned to the absorber where they absorb the vapor exhausted from the turbine. The resulting solution is then pumped to a higher pressure and returned to the boiler. The Kalina process is described in U.S. Pat. Nos. 4,346,561 and 4,489,563. A combined cycle where the Kalina cycle replaces the Rankine cycle used in conventional combined cycle plant is currently under development.

U.S. Pat. No. 4,099,575 describes the use of a absorption/regeneration power cycle for driving a gas turbine, and also for producing cooling in the conventional refrigeration cycle. The process uses potassium bicarbonate and potassium carbonate as the regeneration and absorption fluids. The process was described for use in a desaltination plant to produce water from sea water, which, in combination with such a plant, can also be used to generate electrical power. There is no teaching or suggestion in U.S. Pat. No. 4,099,575 of using the absorption/regeneration cycle in combination with any other power cycles known in the art.

SUMMARY OF THE INVENTION

The present invention is directed to an improved thermodynamic process and system for generating work, and particularly for the conversion of natural gas to electricity, that unlike the prior art cycles, results in minimal or zero nitrogen oxide and carbon emissions. The process and system of the present invention also may be accomplished at a conversion efficiency competitive with the current state of the art combined cycle power plants.

The process of the present invention comprises the steps of: (a) combusting natural gas and oxygen in a combustor to form a gas stream; (b) passing the gas stream through a regenerator where heat from the gas stream causes a strong liquor present in the regenerator at an operating temperature and pressure to form a carbon dioxide stream and a weak liquor, the reduction of heat from the gas stream resulting in an exhaust gas stream; (c) extracting work from the carbon dioxide stream resulting in a work-extracted carbon dioxide stream; (d) introducing the work-extracted carbon dioxide stream, the exhaust gas stream and the weak liquor to an absorber at an operating temperature and pressure to cause carbon dioxide to be absorbed by the weak liquor converting the weak liquor into the strong liquor; (e) introducing said carbon dioxide stream remaining from the absorber to waste and/or the combustor; and (f) introducing the strong liquor from the absorber to the regenerator.

The system of the present invention comprises: (a) a combustor for combusting natural gas and oxygen to form a gas stream; (b) a regenerator for reacting, in the presence of heat from the gas stream, a strong liquor present in the regenerator at an operating temperature and pressure to form a carbon dioxide stream and a weak liquor, the reduction of heat from the gas stream resulting in an exhaust gas stream; (c) a turbine for extracting work from the carbon dioxide stream resulting in a work-extracted carbon dioxide stream; and (d) an absorber for reacting the work-extracted carbon dioxide stream, the exhaust gas stream and the weak liquor at an operating temperature and pressure to cause carbon dioxide to be absorbed by the weak liquor converting the weak liquor into the strong liquor, wherein the carbon dioxide stream remaining from the absorber is introduced to waste and/or the combustor, and the strong liquor from the absorber is introduced to the regenerator.

DETAILED DESCRIPTION OF THE INVENTION

Figure 1:
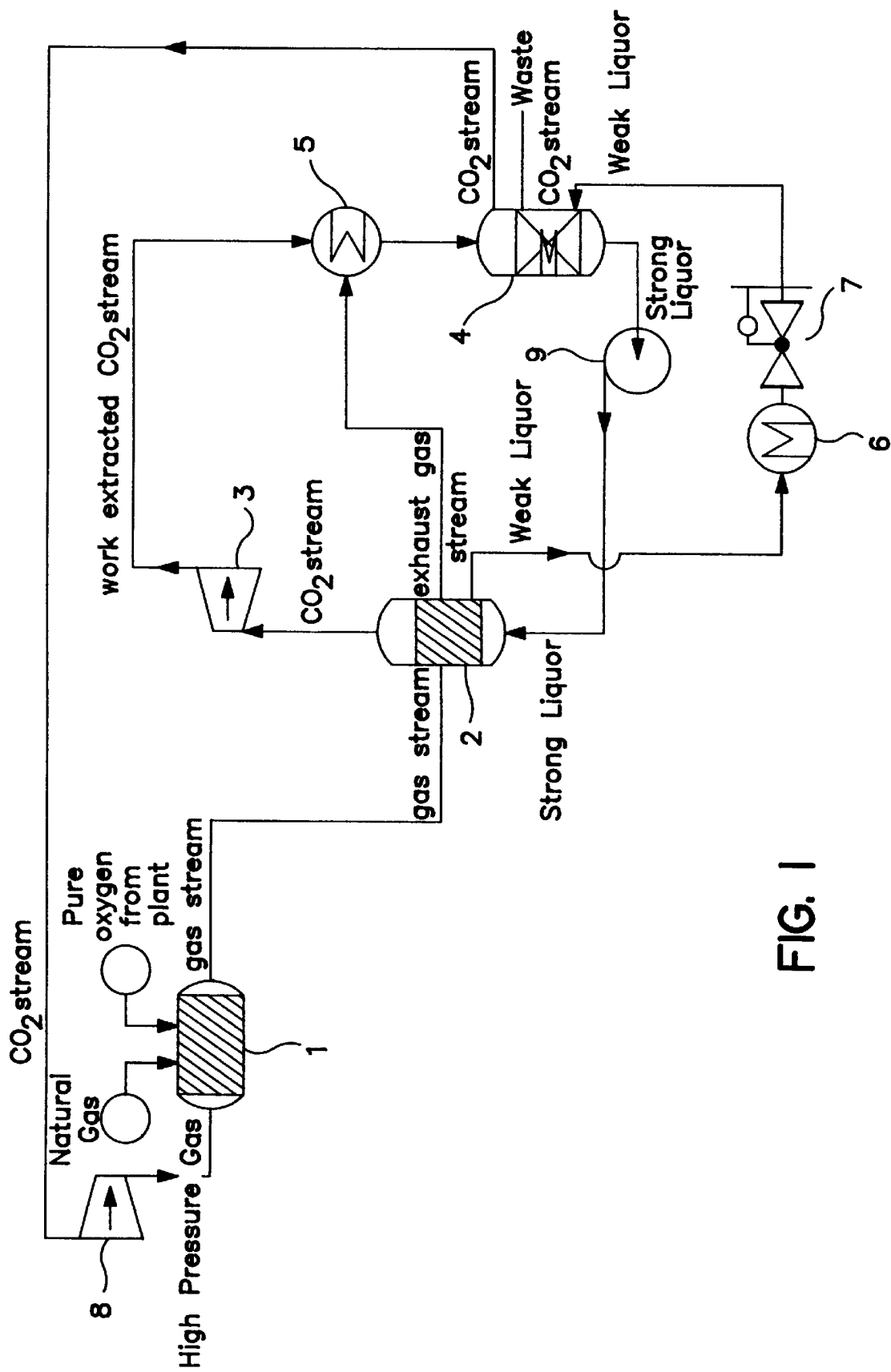
FIG. 1 depicts the basic process and system of the present invention.
Figure 2:
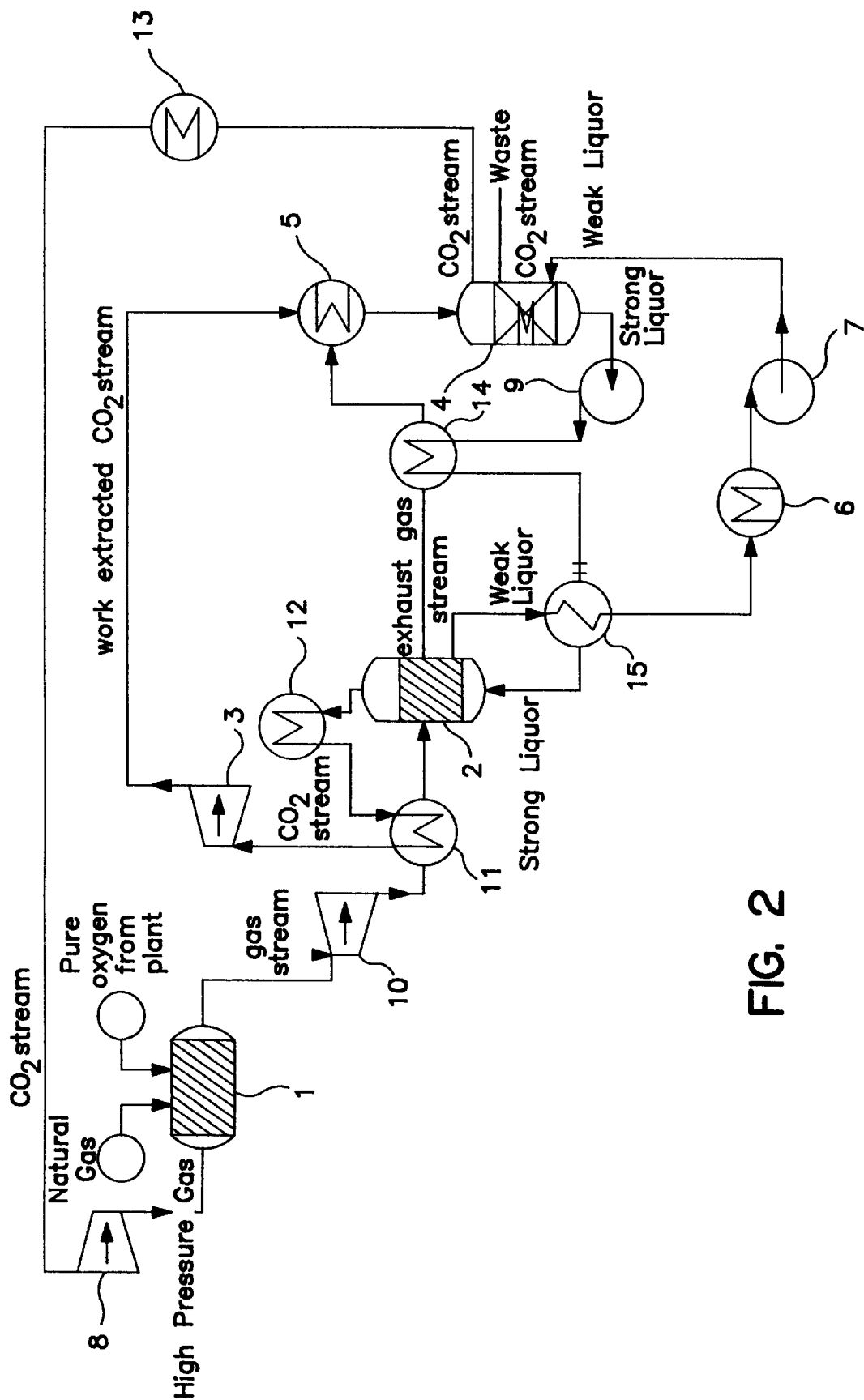
FIG. 2 depicts a more preferred embodiment of the process and system of the present invention.

In the process and system of the present invention, natural gas (methane) and oxygen are combusted in a combustor (1) to form a high temperature and high pressure gas stream as shown in FIG. 1. The oxygen combusted in the combustor is produced by any conventional process from gas. The gas stream is then passed through a regenerator (2) where heat from the gas stream is used to drive a reaction in the regenerator as discussed further below. However, in the preferred embodiment, work may be extracted from the gas stream as shown in FIG. 2 by passing the gas stream through a turbine (10), for example, prior to passing the gas stream through the regenerator (2). This reduces the temperature and pressure of the high temperature and pressure gas stream from the combustor (1).

In the regenerator (2), heat from the gas stream provides sensible heat to a strong liquor present in the regenerator resulting in the formation of a carbon dioxide stream and a weak liquor. As used in the present invention, the "strong liquor" may be any fluid or material that undergoes an endothermic reaction releasing carbon dioxide. In the preferred embodiment, the strong liquor is a solution of potassium bicarbonate. Potassium bicarbonate, in the presence of heat from the gas stream, forms the carbon dioxide stream (i.e. carbon dioxide and water vapor) and the weak liquor (i.e. potassium carbonate and water). It will be understood that the equilibrium of the reaction shifts with temperature. Thus, the higher the temperature, the higher the conversion of bicarbonate to carbonate. This reaction occurs at a range of temperatures as heat is transferred from the gas stream to the solution in the regenerator. It also should be understood that the gas stream does not come into physical contact with the solution. It only gives up sensible heat to the absorber to drive the chemical reaction, and the reduction of heat from the gas stream results in a lower temperature, exhaust gas stream. In addition to bicarbonate/carbonate, the strong/weak liquor may include but is not limited to other carbon dioxide generation/absorption materials such as diethanolamine and monoethanolamine. Although the amine family will work in the present invention, the heat of formation is in excess of 1300 btu/lbm of carbon dioxide absorbed, limiting the thermodynamic efficiency. The bicarbonate/carbonate system is preferred since it has a heat of formation of only 77 btu/lbm of carbon dioxide absorbed. The operating temperature and pressure of the regenerator (2) is the temperature and pressure required for the chemical reaction (i.e. the release of carbon dioxide) to take place, and is readily determinable to the skilled artisan.

Work is then extracted from the carbon dioxide stream reducing its temperature and pressure resulting in a work-extracted carbon dioxide stream. Work may be extracted from the carbon dioxide stream by passing the carbon dioxide stream through a turbine (3) as shown in FIG. 1. The turbine is then used to drive a generator (not shown) for the production of electricity. In order to increase available energy for the turbine (3), the temperature of the carbon dioxide stream may be increased prior to passing the carbon dioxide stream through the turbine (3). This may be accomplished as shown in FIG. 2 using sensible heat from the gas stream via a superheater (11) before the gas stream is passed through the regenerator (2). This also cools the gas stream from the combustor (1). In addition, the carbon dioxide stream may be cooled in dryer (12) to condense water vapor present in the carbon dioxide stream prior to increasing the temperature of the carbon dioxide stream in the superheater (11), as shown in FIG. 2. The condensed water vapor may then be introduced to the regenerator (2).

The work-extracted carbon dioxide stream from the turbine (3), the exhaust gas stream from the regenerator (2) and the weak liquor from the regenerator (2) are then introduced to an absorber (4) where carbon dioxide is absorbed by the weak liquor converting the weak liquor into the strong liquor. This is an exothermic reaction. The temperatures of the work-extracted carbon dioxide stream and/or the exhaust gas stream may be reduced to the operating temperature of the absorber prior to introducing the work-extracted carbon dioxide stream and the exhaust gas stream to the absorber. By way of example, the work-extracted carbon dioxide stream and the exhaust gas stream may be mixed and cooled via cooler (5) to the operating temperature of the absorber prior to introducing the mixture to the absorber (4) as shown in FIG. 1. In addition, the temperature and pressure of the weak liquor from the regenerator (2) also may be reduced to the operating temperature and pressure of the absorber (4) prior to introducing the weak liquor to the absorber. The temperature of the weak liquor may be reduced using a cooler (6), while the pressure of the weak liquor may be reduced through expansion in a pressure reduction valve (7) as shown in FIG. 1. The "operating temperature and pressure" of the absorber (4) is the temperature and pressure required for the absorption of carbon dioxide to take place, and is readily determinable to the skilled artisan.

At least a portion of the carbon dioxide stream remaining from the absorber (4) may then be introduced to waste and/or to the combustor (1) where pure oxygen and gas are added. It is preferred that the portion of carbon dioxide stream introduced to waste is equal in mass to the fuel and oxygen added to the combustor. Before the carbon dioxide stream is introduced to the combustor (1), it may be desirable to increase the pressure of the carbon dioxide stream using a compressor (8) to offset piping friction losses. In addition, the carbon dioxide stream from the absorber (4) also may be cooled using cooler (13) to increase the density of the carbon dioxide stream and reduce the work of the compressor (8) prior to introducing the carbon dioxide stream to the compressor (8), as shown in FIG. 2.

The strong liquor from the absorber (4) is then introduced to the regenerator (2). The pressure of the strong liquor from the absorber (4) is preferably increased to the operating pressure of the regenerator (2) prior to introducing the strong liquor to the regenerator (2) using pump (9) as shown in FIG. 1. The temperature of the strong liquor also may be increased to the operating temperature of the regenerator (2) prior to introducing the strong liquor to the regenerator (2). This may be accomplished by heating the strong liquor using conventional procedures. However, in the preferred embodiment, the temperature of the strong liquor is increased using the sensible heat from the exhaust gas stream via the exhaust gas heat exchanger (14) and/or sensible heat from the weak liquor via the heat recovery heat exchanger (15) as shown in FIG. 2. The exhaust gas heat exchanger (14) also thus reduces the temperature of the exhaust gas stream closer to the operating temperature of the absorber (4). Similarly, the heat recovery heat exchanger (15) reduces the temperature of the weak liquor closer to the operating temperature of the absorber (4). However, if the temperature of the strong liquor is not increased prior to entry into the regenerator (2) using the exhaust gas heat exchanger (14) and/or the heat recovery heat exchanger (15), or some other means, then it is within the confines of the present invention that sensible heat transfer from the weak liquor and/or the exhaust gas to the strong liquor may still occur internally to the regenerator (2).

It should be understood that the optimal pressures, temperatures and mass flow rates of the various flows around the cycle are all variable and interrelated functions of economics, chemistry and thermodynamics. For example, a higher massflow of potassium carbonate and bicarbonate in the cycle relative to the carbon dioxide circulated in turbine (3) will facilitate smaller absorber and regenerator sizes, but at some loss of thermodynamic cycle efficiency.

The process of the present invention is a closed process. The inputs are natural gas and oxygen. The outputs are water, pure carbon dioxide and energy. There are no nitrogen oxide emissions because nitrogen is not present at combustion to react. Furthermore, there are no uncontrolled carbon emissions because the only carbon released is a controlled stream of carbon dioxide. The released carbon dioxide has commercial value.

Although the invention herein has been described with reference to particular embodiments, it is to be understood that these embodiments are merely illustrative of various aspects of the invention. Thus, it is to be understood that numerous modifications may be made in the illustrative embodiments and other arrangements may be devised without departing from the spirit and scope of the invention as defined in the claims which follow hereafter. All patents referenced herein are incorporated by reference.

What is claimed is:

1. A process for generating work comprising the steps of:
   (a) combusting natural gas and oxygen in a combustor to form a gas stream;
   (b) passing said gas stream through a regenerator where heat from said gas stream causes a strong liquor present in said regenerator at an operating temperature and pressure to form a carbon dioxide stream and a weak liquor, the reduction of heat from said gas stream resulting in an exhaust gas stream;
   (c) extracting work from said carbon dioxide stream resulting in a work-extracted carbon dioxide stream;
   (d) introducing said work-extracted carbon dioxide stream, said exhaust gas stream and said weak liquor to an absorber at an operating temperature and pressure to cause carbon dioxide to be absorbed by said weak liquor converting said weak liquor into said strong liquor;
   (e) introducing said carbon dioxide stream remaining from said absorber to waste and/or said combustor; and
   (f) introducing said strong liquor from said absorber to said regenerator.

2. The process of claim 1, wherein work is extracted from said gas stream prior to passing said gas stream through said regenerator.

3. The process of claim 2, wherein work is extracted from said gas stream by passing said gas stream through a turbine.

4. The process of claim 3, wherein the temperature of said gas stream passed through said turbine is reduced prior to passing said gas stream through said regenerator.

5. The process of claim 1, wherein said strong liquor comprises potassium bicarbonate.

6. The process of claim 1, wherein said weak liquor comprises potassium carbonate.

7. The process of claim 1, wherein said carbon dioxide stream comprises carbon dioxide and water vapor.

8. The process of claim 1, wherein work is extracted from said carbon dioxide stream by passing said carbon dioxide stream through a turbine.

9. The process of claim 8, wherein the temperature of said carbon dioxide stream is increased prior to passing said carbon dioxide stream through said turbine.

10. The process of claim 9, wherein said gas stream, prior to passing said gas stream through said regenerator, provides sensible heat to said carbon dioxide stream prior to passing said carbon dioxide stream through said turbine.

11. The process of claim 9, wherein said carbon dioxide stream is cooled to condense water vapor present in said carbon dioxide stream prior to increasing the temperature of said carbon dioxide stream.

12. The process of claim 11, wherein the condensed water vapor is introduced to said regenerator.

13. The process of claim 1, wherein the temperature of said work-extracted carbon dioxide stream is reduced to the operating temperature of the absorber prior to introducing said work-extracted carbon dioxide stream to said absorber.

14. The process of claim 1, wherein the temperature of said exhaust gas stream is reduced to the operating temperature of said absorber prior to introducing said exhaust gas stream to said absorber.

15. The process of claim 1, wherein said work-extracted carbon dioxide stream and said exhaust gas stream are mixed and cooled to the operating temperature of said absorber prior to introducing said work-extracted carbon dioxide and said exhaust stream gas stream to said absorber.

16. The process of claim 1, wherein the temperature and pressure of said weak liquor from said regenerator is reduced to the operating temperature and pressure of said absorber prior to introducing said weak liquor to said absorber.

17. The process of claim 1, wherein the temperature and pressure of said strong liquor from said absorber is increased to the operating temperature and pressure of said regenerator prior to introducing said strong liquor to said regenerator.

18. The process of claim 17, wherein said exhaust gas stream from said regenerator provides sensible heat to said strong liquor stream prior to introducing said strong liquor to said regenerator.

19. The process of claim 17, wherein said weak liquor from said regenerator provides sensible heat to said strong liquor stream prior to introducing said strong liquor to said regenerator.

20. The process of claim 17, wherein said exhaust gas stream from said regenerator and said weak liquor from said regenerator provide sensible heat to said strong liquor stream prior to introducing said strong liquor to said regenerator.

21. The process of claim 1, wherein at least a portion of said carbon dioxide stream remaining from said absorber is introduced to waste.

22. The process of claim 1, wherein at least a portion of said carbon dioxide stream remaining from said absorber is introduced to said combustor.

23. The process of claim 22, wherein said carbon dioxide stream from said absorber is introduced to a compressor to increase the pressure of said carbon dioxide stream prior to introducing said carbon dioxide stream to said combustor.

24. The process of claim 23, wherein said carbon dioxide stream from said absorber is cooled prior to being introduced to said compressor.

* * * * *